(12) United States Patent
Simpson et al.

(10) Patent No.: US 8,117,761 B2
(45) Date of Patent: Feb. 21, 2012

(54) DISPLACEMENT AMPLIFIER

(75) Inventors: Samuel L. Simpson, Nottingham (GB); Jeffrey C. Bishop, Derby (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 12/876,424

(22) Filed: Sep. 7, 2010

(65) Prior Publication Data

US 2011/0094437 A1 Apr. 28, 2011

(30) Foreign Application Priority Data

Oct. 23, 2009 (GB) .................................. 0918602.4

(51) Int. Cl.
*G01D 5/347* (2006.01)
(52) U.S. Cl. ........................................................ 33/706
(58) Field of Classification Search .................... 33/706, 33/709; 74/99 R, 108
See application file for complete search history.

(56) References Cited

U.S. PATENT DOCUMENTS

| | | | |
|---|---|---|---|
| 5,163,463 A | | 11/1992 | Gassman et al. |
| 5,343,894 A | * | 9/1994 | Frisch et al. ............. 137/625.65 |
| 6,557,436 B1 | * | 5/2003 | Hetrick et al. .................. 74/517 |
| 7,478,559 B2 | * | 1/2009 | Tan et al. ......................... 73/718 |
| 7,523,569 B2 | * | 4/2009 | Savard ............................ 37/279 |
| 2004/0159169 A1 | | 8/2004 | Muramatsu |
| 2004/0187329 A1 | | 9/2004 | Saigh et al. |

FOREIGN PATENT DOCUMENTS

| | | |
|---|---|---|
| DE | 2 114 204 A1 | 9/1972 |
| EP | 0 467 873 A2 | 1/1992 |

OTHER PUBLICATIONS

British Search Report dated Apr. 1, 2010 in corresponding British Patent Application No. 0918602.4.
European Search Report issued in Application No. EP 10 17 5379 dated Jul. 12, 2011.

* cited by examiner

*Primary Examiner* — G. Bradley Bennett
(74) *Attorney, Agent, or Firm* — Oliff & Berridge, PLC

(57) ABSTRACT

A displacement amplifier 10 comprises first and second longitudinally extending elements 12, 22, each having a free portion 14, 24 and a constrained portion 16, 26. The constrained portions 16, 26 of the first and second elements 12, 22 are constrained to move together such that longitudinal displacement of a free portion 14 of one element with respect to the free portion 24 of the other element results in an amplified displacement of the constrained portions 16, 26 relative to a resting position.

14 Claims, 7 Drawing Sheets

(A)

(B)

DISPLACEMENT AMPLIFIER

Figure 1:
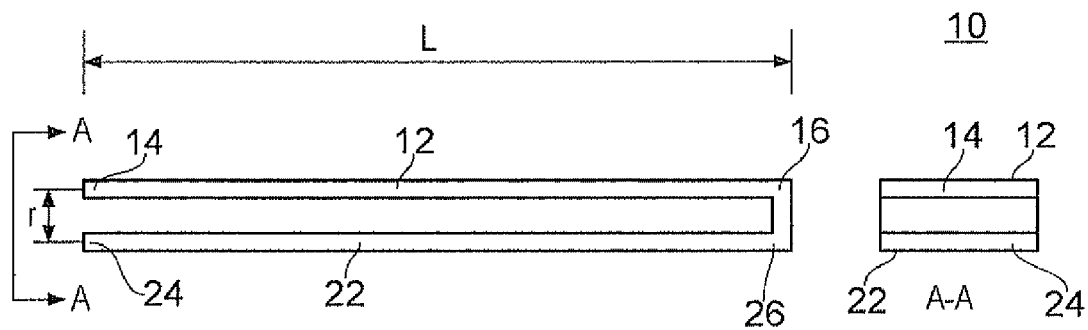

The present invention relates to a displacement amplifier.

Displacement or motion detectors are found on many different scales. Examples include electronic seismographs that record the vibrations of planets, laser-beam transmitters and receivers that register settlement of civil structures, mechanical dial-gauges that indicate positional change in localised features and strain-gauges that measure a components response to stress.

The purpose of all the above mentioned devices is to measure the degree of movement taking place between a point of interest and a fixed datum. The detection device is typically aligned so that it measures the maximum displacement possible since this improves the ability to detect it.

If positive and negative displacement from a central point is to be measured accurately, the detection device must be capable of measuring displacement reversal without introducing hysteresis, or backlash. In the case of the mechanical dial-gauge, hysteresis is overcome by ensuring that the rack of the rack and pinion gearing system (that translates linear deflection into rotary motion) is in permanent mesh with the pinion. This means that a reversal of direction of the rack is instantaneously transmitted to the pinion without hysteresis.

Another attribute of the dial gauge is the ability to provide visual amplification of the movement seen at the detection face. This is done through suitable gearing of the rack and pinion with the indicator needle connected directly or indirectly to the pinion. Typically, one revolution of the indicator needle indicates 1 mm of linear movement at the detection face. A typical dial gauge gives visual amplification in excess of 100/1.

Whilst a dial-gauge is satisfactory for some applications, it comprises many mechanical parts which can be subject to wear and potential failure. The multitude of parts also results in a relatively expensive device.

One of the most common forms of movement amplification is the 'see-saw' action which comprises a member pivotable about a pivot point. Such a device is capable of amplifying both positive and negative displacement but suffers from inherent problems. When the direction of the pivotable member is reversed, so is the direction of the load on the pivot. Since the pivot has clearance, in order to allow the lever to rotate, the reversal of the load on the pivot moves the clearance from one side to the other. This results in free-play, lost-motion or hysteresis.

It is therefore desirable to provide a displacement amplifier which can amplify both positive and negative displacements whilst minimising losses.

According to the present invention there is provided a displacement amplifier comprising first and second longitudinally extending elements arranged side-by-side and engaged with one another along their length, each having a free portion and a constrained portion, wherein the constrained portions of the first and second elements are constrained to move together such that longitudinal displacement of a free portion of one element with respect to the free portion of the other element results in an amplified displacement of the constrained portions relative to a resting position.

The first and second longitudinally extending elements may touch along their length.

In one preferable arrangement, the first and second elements are integrally formed. The first and second elements may be integral with each other at the constrained portions.

In another preferable arrangement, the first and second elements are formed separately. The constrained portions of the first and second elements may comprise corresponding locking portions that are engaged with one another so that the constrained portions are constrained to move together.

Preferably the free portion of the first and/or second portion comprises an attachment portion for attaching the free portion to a moving or fixed part.

There may be provided means for restricting the separation of the first and second elements in a direction transverse to the longitudinal direction when the free portion of one of the elements is longitudinally displaced with respect to the free portion of the other element. The means for restricting separation of the first and second elements may comprise corresponding sliding interlocks provided on the first and second elements that are engaged with one another such that the first and second elements can longitudinally slide with respect to one another but are restricted from transversely separating at the location of the sliding interlocks. There may be a plurality of corresponding sliding interlocks, at least some of which serve to restrict the first and second elements from longitudinally sliding with respect to one another after a threshold displacement.

The means for restricting separation of the first and second elements in a direction transverse to the longitudinal direction may comprise a flexible sleeve surrounding at least a portion of the length of the first and second elements.

The invention also concerns a measuring device comprising a displacement amplifier in accordance with any statement herein. The measuring device may further comprise a scale over which in use the constrained portions travel.

The invention may comprise any combination of the features and/or limitations referred to herein, except combinations of such features as are mutually exclusive.

Figure 2:
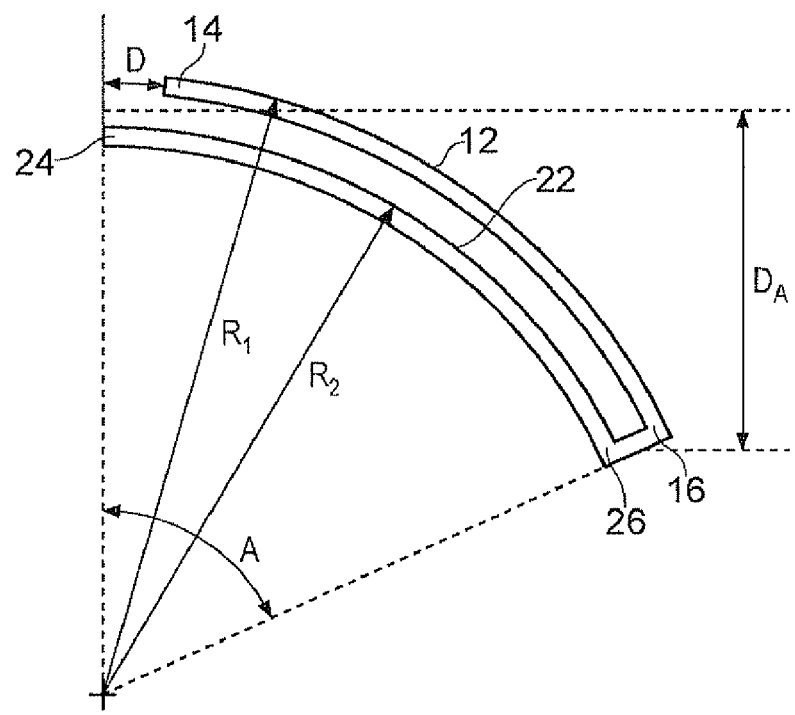
Figure 3:
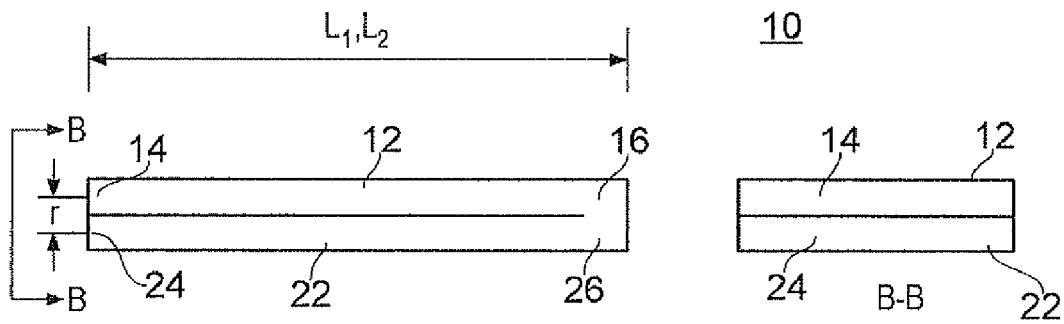
Figure 4:
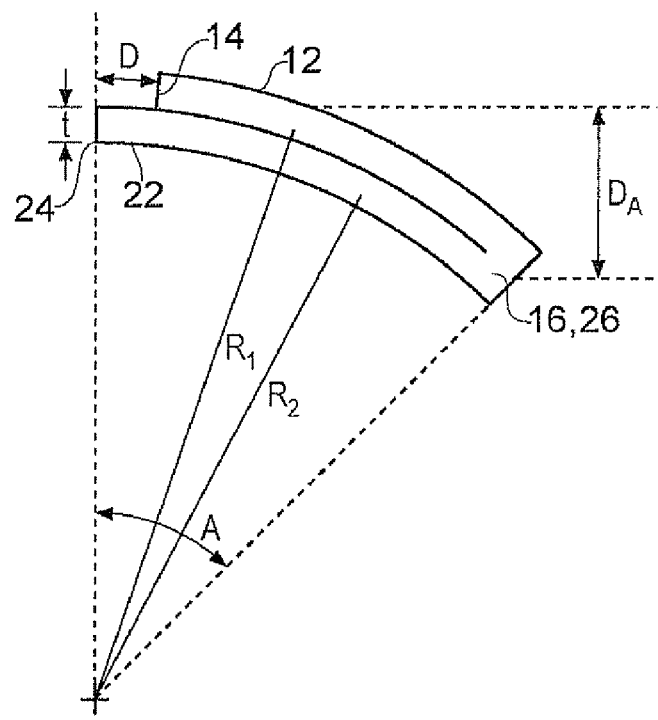
Figure 5:
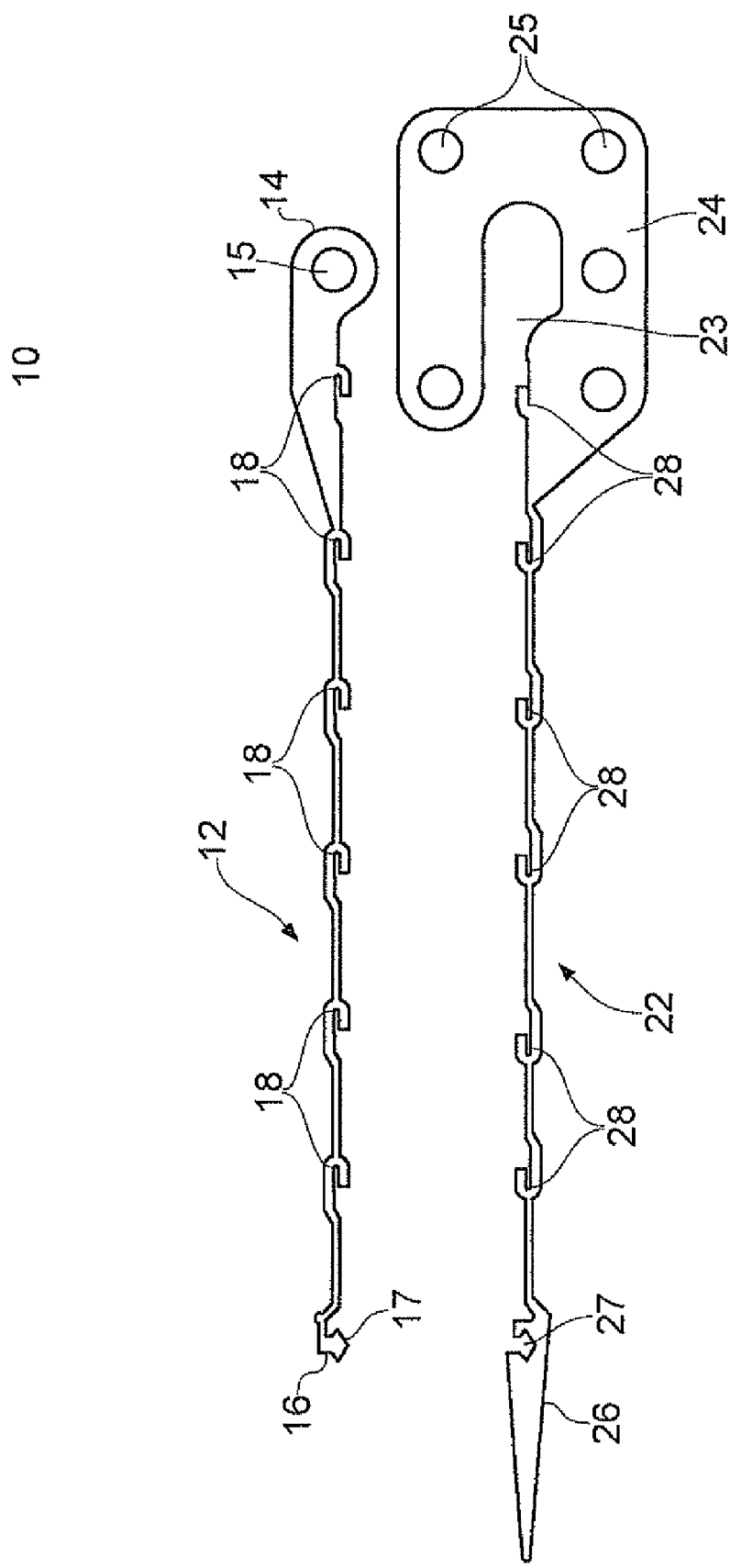
Figure 6:
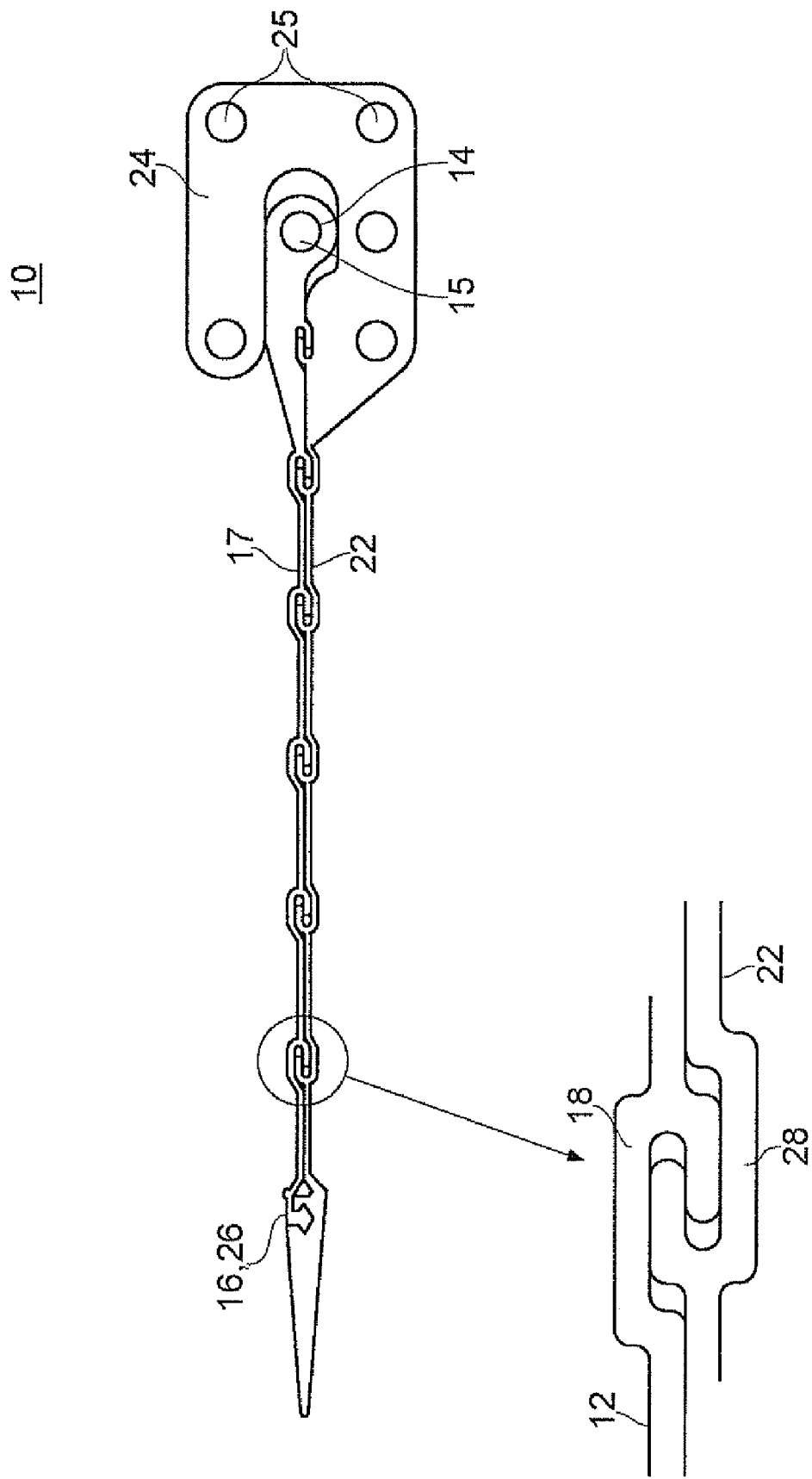
Figure 7:
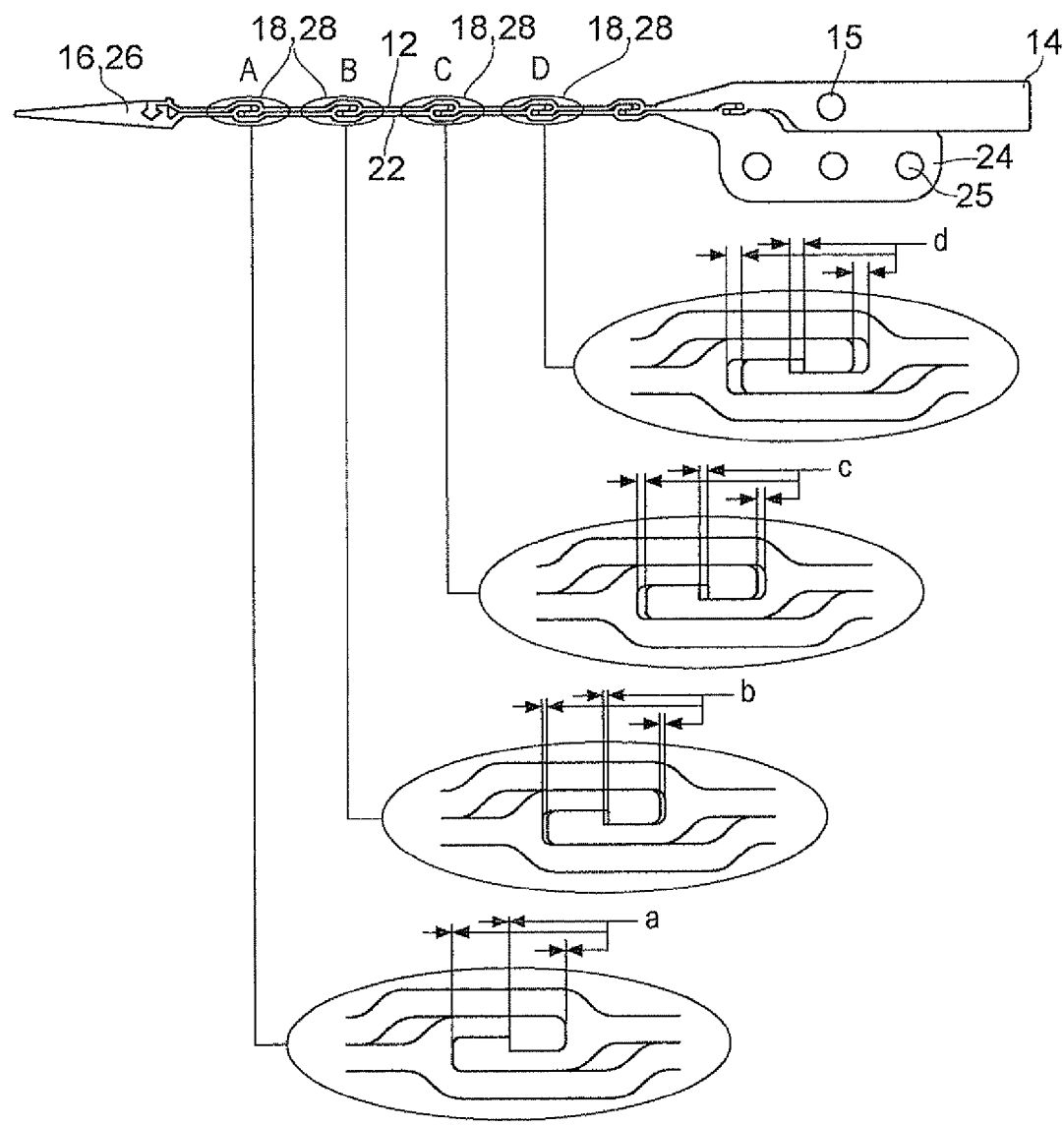
Figure 8:
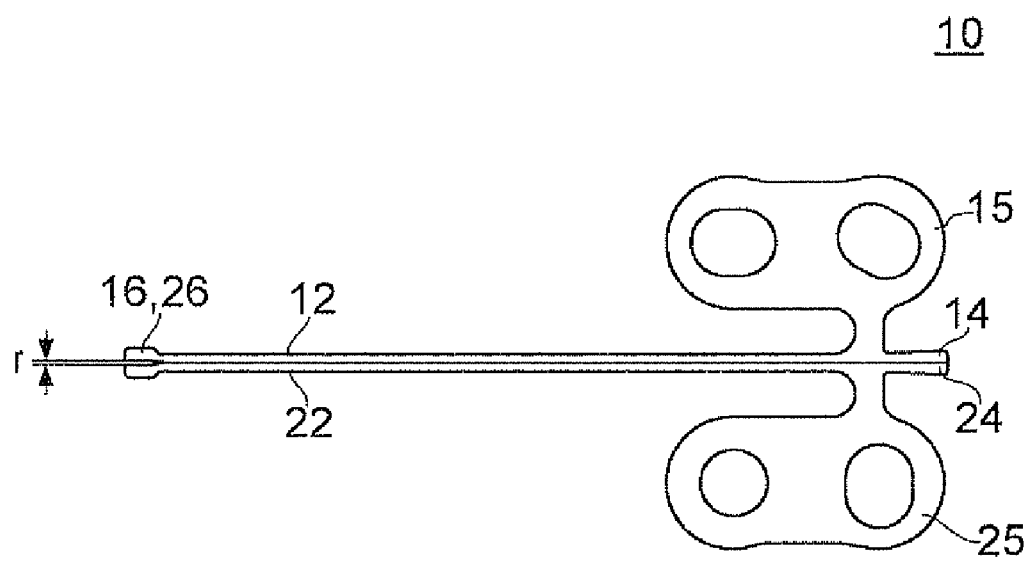
Figure 8:
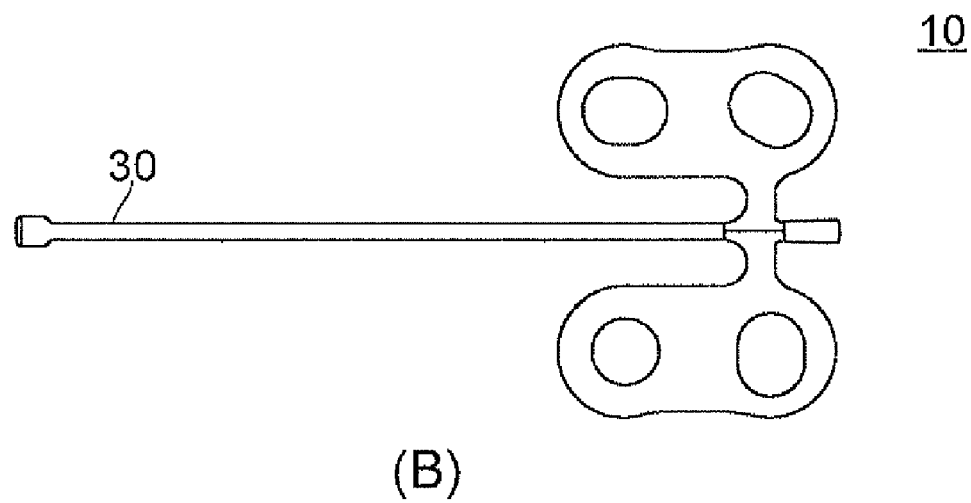
Figure 9:
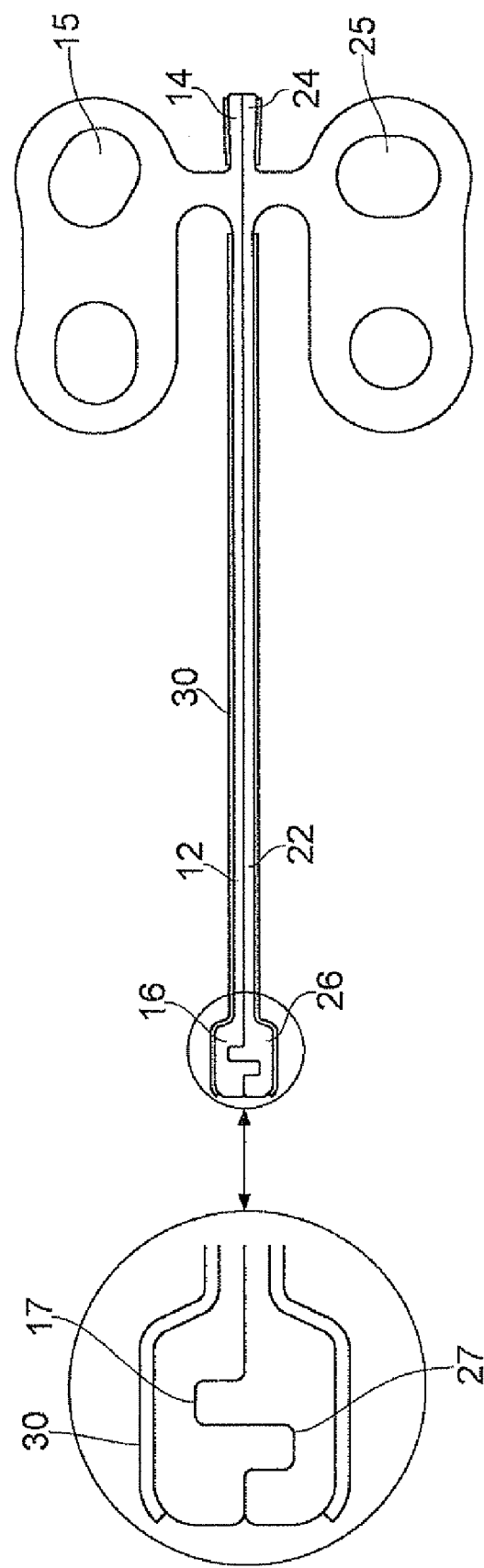

Embodiments of the present invention will now be described, by way of example only, with reference to the accompanying drawings, in which:

FIG. 1 schematically shows a displacement amplifier according to a first embodiment not in accordance with the present invention in the resting state;

FIG. 2 schematically shows the displacement amplifier of FIG. 1 in a displaced state;

FIG. 3 schematically shows a displacement amplifier according to a second embodiment in the resting state;

FIG. 4 schematically shows the displacement amplifier of FIG. 3 in a displaced state;

FIG. 5 schematically shows a displacement amplifier according to a third embodiment with first and second elements disassembled;

FIG. 6 schematically shows the displacement amplifier of FIG. 5 with the first and second elements assembled;

FIG. 7 schematically shows a displacement amplifier according to a fourth embodiment;

FIG. 8 schematically shows a displacement amplifier according to a fifth embodiment; and FIG. 9 schematically shows a displacement amplifier according to a sixth embodiment.

FIG. 1 shows a displacement amplifier 10 comprising a first longitudinally extending element 12 and a second longitudinally extending element 22 that are each elastically deformable, at least in bending. The first and second elements 12, 22 are of the same length L and, as shown in the end view at A-A, have identical rectangular cross-sections. Each of the elements 12, 22 has a first free portion (or end) 14, 24 and a second constrained portion (or end) 16, 26. In the resting state shown in FIG. 1, the first and second elements 12, 22 are parallel and their neutral bending axes are spaced apart from one another by a distance r, which represents the neutral axis separation. The free portions 14, 24 are adjacent to one another and are free to move with respect to one another. The constrained portions 16, 26 are fixed to one another and are constrained to move together.

With reference to FIG. 2, in use, the free portion 24 of the second element 22 is held fixed and the free portion 14 of the first element 12 is displaced in the longitudinal direction of the first element 12 by an amount D. Provided that the first and second elements 12, 22 remain parallel, this causes the displacement amplifier to curve, so that the constrained portions 16, 26 of the first and second elements 12, 22 are displaced by an amount $D_A$ which is greater than the original displacement D. The amplified displacement $D_A$ can be calculated using the following equations:

$$R_2 A = L \quad (1)$$

$$R_1 A = L + D \quad (2)$$

$$R_1 - R_2 = r \quad (3)$$

$$D_A = (R_1 + R_2)/2 \times (1 - \cos A) \quad (4)$$

In these equations $R_1$ and $R_2$ are the radius of curvature of the neutral axes of the respective elements 12, 22.

From equations (1), (2) and (3) above:

$$R_1 A - R_2 A - A(R_1 - R_2) = Ar = D$$

$$A = D/r \quad (5)$$

Using equations (1) and (5):

$$Lr/D = R_2 \quad (6)$$

Using equations (4), (5) and (6):

$$D_A = ((R_2 + r) + R_2)/2 \times (1 - \cos A)$$

$$D_A = (2R_2 + r)/2 \times (1 - \cos(D/r))$$

$$D_A = (Lr/D + r/2) \times (1 - \cos(D/r)) \quad (7)$$

Accordingly, the displacement amplification is:

$$D_A/D = [(Lr/D + r/2) \times (1 - \cos(D/r))]/D \quad (8)$$

Table 1 below shows the relationship between the displacement D of the free portion 14 of the first element 12, the amplified displacement $D_A$ of the constrained second portions 16, 26, and the amplification factor $D_A/D$:

TABLE 1

| L | R | D | $D_A$ | $D_A/D$ |
|---|---|---|---|---|
| 50 | 0.5 | 0.1 | 4.99 | 49.88 |
| 50 | 0.5 | 0.2 | 9.89 | 49.44 |
| 50 | 0.5 | 0.3 | 14.60 | 48.66 |
| 50 | 0.5 | 0.4 | 19.03 | 47.58 |
| 50 | 0.5 | 0.5 | 23.10 | 46.20 |

As shown in Table 2, as the length L of the first and second elements 12, 22 increases, the amplification factor $D_A/D$ increases. The relationship between the length and the amplification factor is approximately proportional.

TABLE 2

| L | r | D | $D_A$ | $D_A/D$ |
|---|---|---|---|---|
| 50 | 0.5 | 0.1 | 4.99 | 49.88 |
| 75 | 0.5 | 0.2 | 14.82 | 74.10 |
| 100 | 0.5 | 0.3 | 29.15 | 97.18 |
| 125 | 0.5 | 0.4 | 47.47 | 118.66 |
| 150 | 0.5 | 0.5 | 69.07 | 138.14 |

As shown in Table 3, as the neutral axis separation r decreases, the amplification factor $D_A/D$ increases. The relationship between the neutral axis separation and the amplification factor is approximately inversely proportional.

TABLE 3

| L | r | D | $D_A$ | $D_A/D$ |
|---|---|---|---|---|
| 50 | 0.5 | 0.1 | 4.99 | 49.88 |
| 50 | 0.4 | 0.1 | 6.22 | 62.24 |
| 50 | 0.3 | 0.1 | 8.26 | 82.65 |
| 50 | 0.2 | 0.1 | 12.25 | 122.54 |
| 50 | 0.1 | 0.1 | 23.01 | 230.08 |

The characteristics of the displacement amplifier are the same in either direction and there is no hysteresis loss.

FIGS. 3 and 4 show a second embodiment of a displacement amplifier 10. In this embodiment the neutral axis separation r is the absolute physical minimum and therefore in the resting state, shown in FIG. 3, the first and second elements 12, 22 are touching along their lengths. By minimising the neutral axis separation r, the amplification factor is maximised. Since the thickness t of the elements is identical, the neutral axis separation r is equal to the thickness t.

FIGS. 5 and 6 show a third embodiment of a displacement amplifier 10, comprising first and second elements 12, 22. The free portion 14 of the first element 12 constitutes a first attachment portion provided with a hole 15, by which in use the first attachment portion 14 is attached to a moving part. The free portion 24 of the second element 22 constitutes a second attachment portion provided with a plurality of holes 25, by which in use the second attachment portion 24 is attached to a static part which the moving part moves relative to. The free portion 24 of the second element 22 further includes a longitudinal slot 23 within which the free portion 14 of the first element 12 can be located and longitudinally move. The constrained portion 16 of the first element 12 also includes a first locking portion 17 in the form of a projection which is located within a second locking portion 27 in the form of a recess provided on the constrained portion 26 of the second element 22. The constrained portion 26 of the second element 22 tapers to a point, to serve as an indicating pointer. Along the length of the first and second elements 12, 22 there are provided corresponding sliding interlocks 18, 28 which are engaged with one another in a manner that permits relative sliding displacement in the longitudinal direction of the first and second elements 12, 22.

In use, the first attachment portion 14 of the first element 12 is attached to a moving part and the second attachment portion 24 is attached to a fixed static part. The first locking portion 17 is engaged with the second locking portion 27 which ensures that the constrained portions 16, 26 of the first and second elements 12, 22 are constrained to move together. When the free portion 14 of the first element 12 is displaced in the longitudinal direction with respect to the free portion 24 of the second element 22, it slides longitudinally in the longitudinal slot 23. The first element 12 slides over the second element 22, in a similar manner to that of the second embodiment, and the constrained portions 16, 26 are displaced from the resting position by an amplified displacement that is greater than the original displacement applied to the first free portion 14. The sliding interlocks 18, 28 allow the first element 12 to longitudinally slide over the second element 22 whilst preventing the first and second elements 12, 22 from separating along their length. This improves the amplification factor compared to a situation where the elements are allowed to separate along their length.

FIG. 7 shows a fourth embodiment of a displacement amplifier 10 which is similar to the third embodiment. The difference between the third and fourth embodiments is the arrangement of the sliding interlocks 18, 28. In the embodiment of FIG. 7 there are four nodes A, B, C, D at which there are provided corresponding sliding interlocks 18, 28. As the free portion 14 of the first element 12 is longitudinally displaced with respect to the free portion 24 of the second element 22, the first element 12 longitudinally slides over the second element 22.

The first sliding interlock 18 provided on the first element 12 comprises three engaging faces 18a. 18b, 18c and the second sliding interlock 28 provided on the second element 22 comprises three engaging faces 28a, 28b, 28c. The first and second sliding interlocks 18, 28 are engaged with one another such that the engaging faces 18a and 28b are adjacent, the engaging faces 18b and 28a are adjacent and the engaging faces 18c and 28c are adjacent.

When the free portion 14 of the first element 12 is displaced longitudinally with respect to the second element in the direction X, after a displacement a, the engaging faces 18a and 28b and the faces 18b and 28a abut at node A and the node 'locks-out'. This prevents any further longitudinal displacement between the first and second elements 12, 22 beyond the first node A. The first node A therefore acts as a temporary constrainment and reduces the effective length of the first and second elements 12, 22. After a displacement of b the second node B locks out, after a displacement of c the third node C locks out and after a displacement of d the fourth node D locks out, all in a similar manner to the first node A. This progressive nodal lock-out progressively reduces the effective length of the first and second elements 12, 22. This results in the amplification factor decreasing as the displacement D increases.

When the first portion 14 of the first element 12 is displaced longitudinally with respect to the second element in the direction Y, after a displacement a the engaging faces 18c and 28c abut at node A and the node 'locks-out'. This prevents any further longitudinal displacement between the first and second elements 12, 22 beyond the first node A. After a displacement of b the second node B locks out, after a displacement of c the third node C locks out and after a displacement of d the fourth node locks out, all in a similar manner to the first node A. The progressive nodal lock-out when the free portion 14 is displaced in the direction Y is the same as when the free portion is displaced in the opposite direction X.

By way of example, the distances a, b, c and d respectively may be 0.060 mm, 0.195 mm, 0.430 mm and 0.815 mm.

In a fifth embodiment shown in FIG. 8, the first and second elements 12, 22 are prevented from separating along their entire length by using a tubular constraint 30 which may be a shrink-fit tube or rubber sleeve, as opposed to by using nodal constraints as in the embodiments of FIGS. 5-7. The first and second elements 12, 22 are manufactured from a single piece of material by laser machining. The constraining force required to ensure continuous contact between the elements 12, 22 is relatively small. Ideally it needs to be completely internalised and also needs to be in equilibrium in a direction perpendicular to the longitudinal direction of the elements so that the constraining force has no axial component.

FIG. 8A shows the displacement amplifier 10 without the shrink-fit tube constraint 30 whilst FIG. 8B shows the shrink-fit tube constraint 30 in place. The tube constraint 30 envelops the length of the first and second elements 12, 22 and provides a constraining force such that when the free portion 14 of the first element 12 is longitudinally displaced with respect to the free portion 24 of the second element 22, the elements do not separate but instead slide along one another while in contact over the whole of their lengths. This improves the amplification factor. A rear portion of shrink-fit tube constraint 32 is provided that envelops the free ends of the first and second elements 12, 22. This helps to ensure that the elements 12, 22 remain in contact along their length.

FIG. 9 shows a sixth embodiment which is similar to the fifth embodiment except the first and second elements 12, 22 are manufactured separately. The first and second constrained portions 16, 26 have corresponding first and second locking portions 17, 27. The shrink-fit tube constraint 30 extends over the portions 16, 26 and holds them together such that they are constrained to move together when the free portion 14 of the first element 12 is displaced longitudinally with respect to the free portion 24 of the second element 22.

The elements 12, 22 of the displacement amplifier 10 may be manufactured from extremely thin sheet materials, such as rectangular or square section wire, and the conjoinment of the first and second constrained portions 16, 26 may be achieved by riveting, brazing, micro-welding, fusion bonding, multiple folding or adhesive, for example. As will be readily apparent to one skilled in the art, any other suitable technique may be used. The free portions 14, 24 of the elements 12, 22 may be attached either directly or indirectly to actuators by any of the above-mentioned techniques or by any other suitable method.

The means for preventing the elements 12, 22 from separating along their length may be achieved by surface tension, electro or permanent magnets, non-setting adhesives, shrink-fit tubes, rubber sleeves or by any other suitable method.

The displacement amplifier 10 according to the present invention may be incorporated into a measuring device so that small-scale displacements can be visually observed easily and measured accurately if necessary. For this purpose as shown in FIGS. 5-7, the constrained portions 16, 26 may be configured as a pointer, to move over a suitable scale to indicated relative displacement at the free portions 14, 24.

Reverse activation is also possible. The constrained portions 16, 26 may be displaced in order to obtain a smaller relative displacement between the free portions 14, 24. This may be useful for micro-adjustment purposes.

The above-described displacement amplifiers 10 have a number of significant advantages over conventional displacement amplifier devices. They are very simple devices and comprise a relatively small number of components. This improves the ease of manufacture and results in an inexpensive device. The displacement amplifier according to the present invention is also capable of being used in many different applications on a wide range of scales.

The present invention provides a displacement amplifier that has a high amplification factor when compared to conventional devices. The amplifier requires no external source of power which makes it suitable for many applications. Importantly, unlike previously considered devices, it does not have a pivot requiring a bearing. This results in a device that can amplify displacement in either direction without exhibiting hysteresis losses.

The invention claimed is:

1. A displacement amplifier comprising first and second longitudinally extending elements arranged side-by-side and engaged with one another along their length such that the first and second longitudinally extending elements touch along their length, each having a free portion and a constrained portion, wherein the constrained portions of the first and second elements are constrained to move together such that longitudinal displacement of a free portion of one element with respect to the free portion of the other element results in an amplified displacement of the constrained portions relative to a resting position.

2. A displacement amplifier according to claim 1, wherein the first and second elements are integrally formed.

3. A displacement amplifier according to claim 2, wherein the first and second elements are integral with each other at the constrained portions.

4. A displacement amplifier according to claim 1, wherein the first and second elements are formed separately.

5. A displacement amplifier according to claim 4, wherein the constrained portions of the first and second elements comprise corresponding locking portions that are engaged with one another so that the constrained portions are constrained to move together.

6. A displacement amplifier according to claim 1, wherein the free portion of the first and/or second element comprises an attachment portion for attaching the free portion to a moving or fixed part.

7. A displacement amplifier according to claim 1, further comprising means for restricting the separation of the first and second elements in a direction transverse to the longitudinal direction when the free portion of one of the elements is longitudinally displaced with respect to the free portion of the other element.

8. A displacement amplifier according to claim 1, wherein the means for restricting separation of the first and second elements in a direction transverse to the longitudinal direction comprises corresponding sliding interlocks provided on the first and second elements that are engaged with one another such that the first and second elements can longitudinally slide with respect to one another but are restricted from transversely separating at the location of the sliding interlocks.

9. A displacement amplifier according to claim 8, wherein there are a plurality of corresponding sliding interlocks, at least some of which serve to restrict the first and second elements from longitudinally sliding with respect to one another after a threshold displacement.

10. A displacement amplifier according to claim 1, wherein the means for restricting separation of the first and second elements in a direction transverse to the longitudinal direction comprises a flexible sleeve surrounding at least a portion of the length of the first and second elements.

11. A measuring device comprising a displacement amplifier in accordance with claim 1.

12. A measuring device according to claim 11, further comprising a scale over which in use the constrained portions travel.

13. A displacement amplifier according to claim 1, wherein the first and second longitudinally extending elements touch along their length at a plane common to external surfaces of both first and second longitudinally extending elements when the first and second longitudinally extending elements are in the resting position.

14. A displacement amplifier according to claim 1, wherein the first and second longitudinally extending elements are parallel to each other, touch along their length in the resting position and touch each other along their length in a displaced position.

\* \* \* \* \*